United States Patent [19]
Johnson et al.

[11] Patent Number: 5,851,030
[45] Date of Patent: Dec. 22, 1998

[54] REGENERATIVE MONOPROPELLANT AIRBAG INFLATOR

[75] Inventors: Darrin L. Johnson, Fountain Hills, Ariz.; Bradley D. Harris, Farmington; Donald R. Lauritzen, Hyrum, both of Utah

[73] Assignee: Autoliv ASP, Inc., Ogden, Utah

[21] Appl. No.: 759,995

[22] Filed: Dec. 3, 1996

[51] Int. Cl.[6] .......................... B60R 21/28; B60R 21/26; C06D 5/00
[52] U.S. Cl. .......................... 280/741; 102/530; 280/736
[58] Field of Search .................................. 280/741, 742, 280/736; 102/530, 531

[56] References Cited

U.S. PATENT DOCUMENTS

| | | | |
|---|---|---|---|
| 3,690,255 | 9/1972 | Vass et al. | |
| 5,060,973 | 10/1991 | Giovanetti | 280/741 |
| 5,487,561 | 1/1996 | Mandzy et al. | 280/741 |
| 5,639,117 | 6/1997 | Mandzy et al. | 280/741 |
| 5,719,351 | 2/1998 | Johnson et al. | 102/530 |

*Primary Examiner*—Charles T. Jordan
*Assistant Examiner*—Theresa M. Wesson
*Attorney, Agent, or Firm*—Sally J. Brown

[57] ABSTRACT

A regenerative monopropellant inflator having improved initiation of the regenerative cycle and improve operating efficiency. The inflator may direct the flow of the monopropellant into a localized volume to create a "hot spot" to increase combustion. This serves to ensure that the regenerative cycle is initiated. Various arrangements are provided to increase the residence time of the combusting monopropellant within the inflator, to ensure complete combustion of the monopropellant, and thus increased efficiency. These arrangements include inducing a helical gas flow to increase the length of the path traveled by the gas. Various barriers may also be placed within the gas flow to force direction changes, which reduce the velocity of the gas.

15 Claims, 4 Drawing Sheets

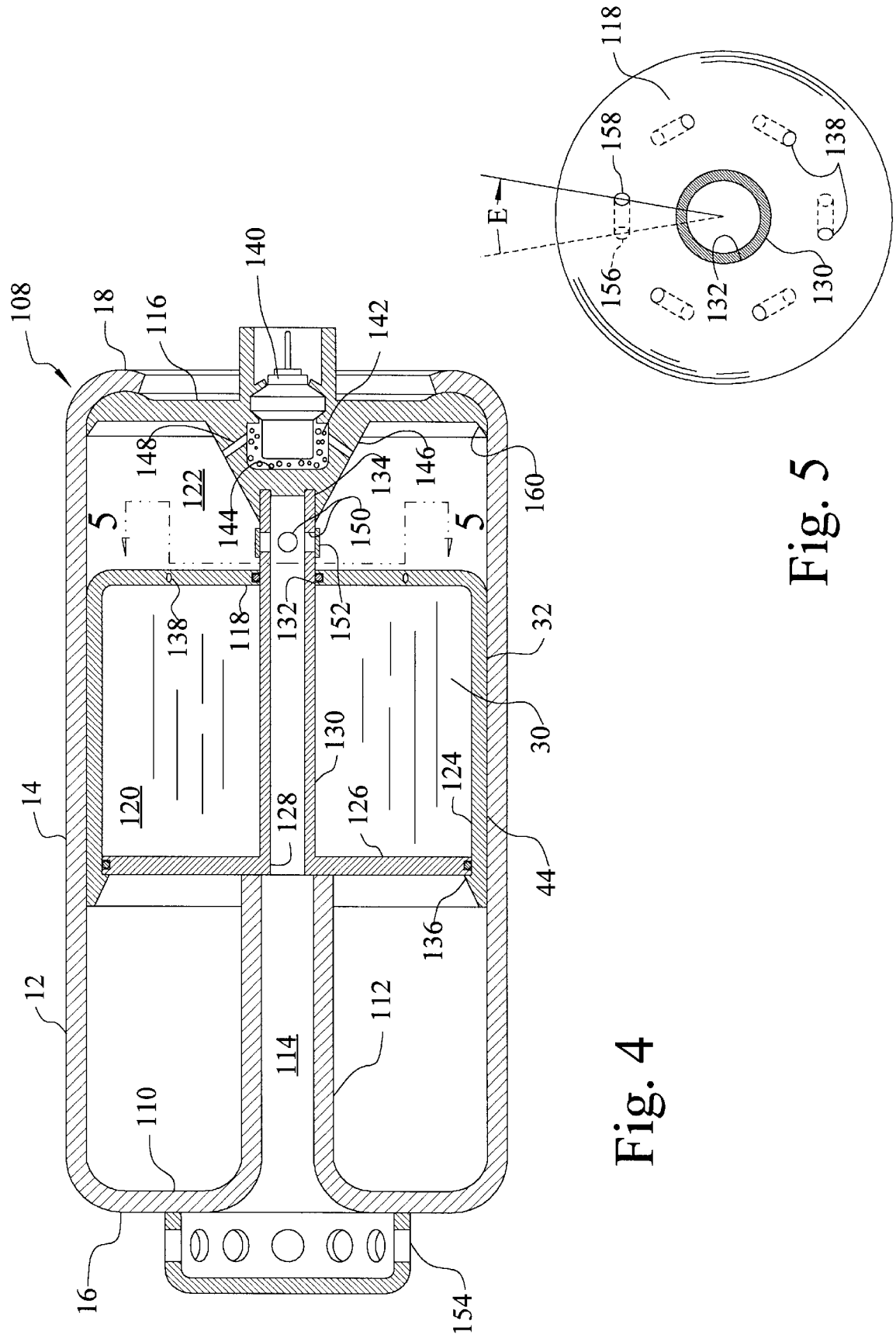

REGENERATIVE MONOPROPELLANT AIRBAG INFLATOR

BACKGROUND OF THE INVENTION

1. Field of the Invention

The present invention relates in general to regenerative monopropellant inflators for airbag passive restraint systems. In particular, the present invention relates to an improved piston and combustion chamber design for regenerative monopropellant inflators.

2. Description of the Related Art

Airbag passive restraint systems have become increasingly common in passenger vehicles. Airbag systems typically include a collision sensor which provides a signal upon sensing the onset of a collision. The collision sensor is connected to an inflator which very rapidly produces a quantity of gas upon receipt of the signal. The inflator is in turn connected to a flexible fabric cushion. The cushion is inflated by the gas, and it is the compression of this inflated cushion which protects the passenger.

Various general classes of airbag inflators are known, and are grouped according to their operating principle. Two of the most common types are typically referred to as pyrotechnic and hybrid. Pyrotechnic inflators employ pellets of material (typically sodium azide) which rapidly burn to produce nitrogen gas. These inflators are small and relatively light weight, but sodium azide (in solid form) is poisonous. Hybrid inflators employ a quantity of stored, pressurized inert gas, together with a charge of pyrotechnic material (typically not sodium azide). The pyrotechnic material heats the stored gas to increase its pressure when filling the cushion. While hybrid inflators avoid the poisonous sodium azide, the pressure vessel for the pressurized gas is typically rather large, and poses the risk of rupturing. Further, there is the possibility that the stored gas will leak from the vessel, rendering the inflator useless.

The present invention is concerned with yet another type of inflator, referred to as a regenerative monopropellant inflator. Such inflators generally include a housing having an interior. Within this interior is a piston, which divides the interior of the housing into a fuel storage chamber and a combustion chamber. Within the storage chamber is a monopropellant: a fuel which will burn (or oxidize or decompose) rapidly upon ignition, creating a suitable gas. The piston (or some other part of the inflator) includes passages to permit the fuel to flow from the storage chamber to the combustion chamber. These passages are initially blocked.

The inflator further includes an initiator, which produces a small charge of heat and pressure within the combustion chamber. This pressure drives the piston back away from the combustion chamber, compressing the fuel storage chamber. This compression of the fuel causes the pressure of the fuel to rise, which unblocks the fuel flow passages. As such, a flow of fuel jets into the combustion chamber, and is ignited. This again produces more pressure, which serves to drive the piston further back. This again causes more fuel to flow into the combustion chamber to ignite, and again cause pressure. This self-sustaining combustion process is the reason these inflators are referred to as "regenerative."

Regenerative monopropellant inflators provide several advantages. They need not employ toxic fuels, are not initially pressurized, are relative small and light weight, and the gas is produced with an advantageous pressure versus time curve. There are also areas in which such inflators could be improved. For example, starting the regenerative reaction can be difficult. Even though the initiator fires, the initially combusted fuel may not burn sufficiently to generate enough pressure to maintain the reaction. Further, throughout the combustion process there is a tendency for the fuel to exit the inflator before fully combusting. This wasting of fuel requires that the inflator hold more fuel than is strictly necessary.

SUMMARY OF THE INVENTION

An object of the present invention is to provide an airbag inflator which safely and reliably provides inflation gas.

Another object of the present invention is to provide a regenerative monopropellant inflator which has increased combustion, for improved initiation of the regenerative reaction, and for increased fuel efficiency.

A further object of the present invention is to provide improved initiation of the regenerative reaction by focusing the flow of monopropellant into a localized volume to cause increased temperatures in this area, and thus more complete combustion.

Yet another object of the present invention is to provide improved combustion of the monopropellant during the regenerative cycle by increasing the residence time of the monopropellant within the inflator.

Yet a further object of the present invention is to increase residence time by forcing direction changes in the flow of gas through the inflator to reduce the velocity of the gas.

Another object of the present invention is to increase residence time by inducing the gas flow into one or more helical swirls to increase the length of the path traveled by the gas.

These and other objects are achieved by a regenerative monopropellant inflator having improved initiation of the regenerative cycle and improve operating efficiency. The inflator may direct the flow of the monopropellant into a localized volume to create a "hot spot" to increase combustion. This serves to ensure that the regenerative cycle is initiated. Various arrangements are provided to increase the residence time of the combusting monopropellant within the inflator, to ensure complete combustion of the monopropellant, and thus increased efficiency. These arrangements include inducing a helical gas flow to increase the length of the path traveled by the gas. Various barriers may also be placed within the gas flow to force direction changes, which reduce the velocity of the gas.

BRIEF DESCRIPTION OF THE DRAWINGS

The objects and features of the invention noted above are explained in more detail with reference to the drawings, in which like reference numerals denote like elements, and in which:

FIG. 4 is a side view in partial cross-section showing an inflator according to a second embodiment of the present invention;

FIG. 5 is plan view along line 5—5 of FIG. 4;

DETAILED DESCRIPTION OF THE INVENTION

Figure 1:
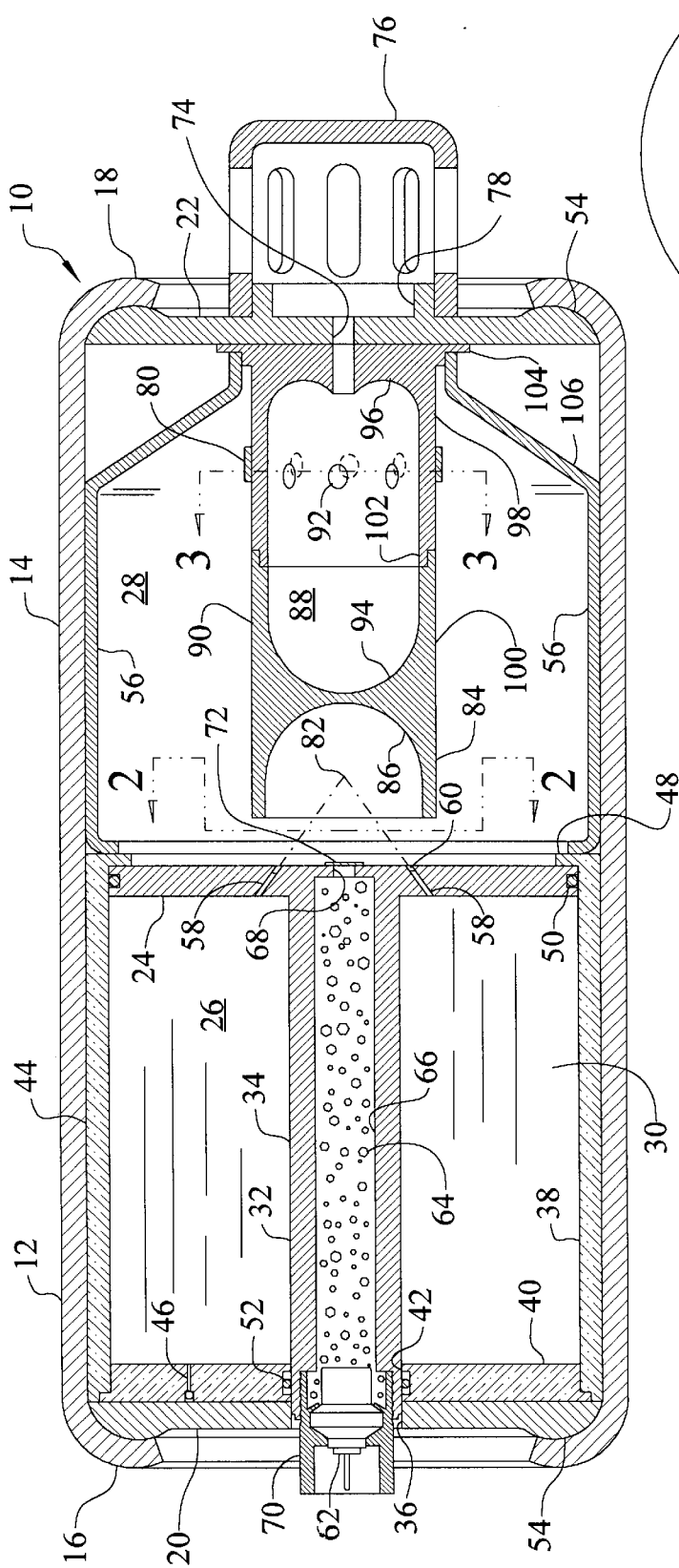
FIG. 1 is a side view in partial cross-section showing an inflator according to a first embodiment of the invention.

With reference to FIG. 1, a first embodiment of a regenerative monopropellant airbag inflator is generally designated by reference numeral 10. The inflator 10 includes a housing 12 defined by a sidewall 14 having a first end 16 and a second end 18. The sidewall will preferably take the general form of a cylindrical tube, but other cross-sectional shapes may be employed. The sidewall defines a longitudinal axis (not shown) extending between the first and second ends. The housing further includes first and second end caps 20 and 22, secured to the first and second ends, respectively. The housing is formed of a material sufficiently rugged to survive the temperatures and pressures generated, typically a metal such as steel or aluminum.

As may be seen, the sidewall and end caps of the housing serve to define an interior. Mounted within this interior is a piston 24, oriented substantially normal to the longitudinal axis of the housing. The piston serves to generally divide the interior of the housing into a fuel supply chamber 26 and a combustion chamber 28. Within the fuel supply chamber 26 there is stored a quantity of a fluid monopropellant 30. One suitable fluid monopropellant is hydroxyl ammonium nitrate (HAN), which takes the form of a liquid. The HAN is relatively safe to work with and store, since it will only combust if it is pressurized, thus reducing the possibility of unintentional activation. Further, the HAN is nontoxic, though corrosive. When placed under pressure, however, this liquid is capable of rapid combustion to form gaseous nitrogen.

The piston 24 is mounted to permit movement with respect to the housing toward the first end 16. To ensure that the piston remains substantially normal to the longitudinal axis, the piston is preferably provided with piston alignment means 32. In the embodiment of FIG. 1, the means 32 takes the form of a stem 34 fixed to the piston, and extending from the piston to, and through, a stem aperture 36 in the first end 16. As may be envisioned, the stem 34 will slide through the stem aperture 36 in the first end 16 as the piston moves toward the first end 16, thus retaining the proper orientation of the piston. Various other means may be used for the piston alignment means 32. For example, a plurality of slide rods could be provided, each extending through the first end 16. Alternatively, the piston could be provided with a peripheral skirt (see FIGS. 4 and 8). Other arrangements for the piston alignment means 32 will be apparent to those skilled in the art.

To ease assembly, it is typically preferred that the piston 24 and fuel supply chamber 26 be formed as a complete unit which may be inserted into the housing 12, with portions of this unit becoming a part of the housing. For example, in the embodiment of FIG. 1, there is provided a cylindrical chamber wall 38, having longitudinal ends. An end wall 40 closes the first of these longitudinal ends, adjacent first end 16 of the housing. The piston 24 is placed within the chamber wall at the second of the chamber wall ends. The end wall 40 includes a stem opening 42 which receives the piston stem 34. The piston 24 slides within the chamber wall 38, and the stem 34 slides through the end wall 40. As may be seen, the piston, chamber wall, end wall, and stem all serve to define the fuel supply chamber 26, and will retain the monopropellant 30. When filled with the monopropellant 30, a tank subassembly 44 is formed.

This tank subassembly may be assembled at a protected location to minimize the dangers created by the monopropellant 30. The monopropellant 30 may be introduced through a fill valve 46, which is then sealed appropriately. This filling of the tank subassembly 44 will preferably create only mild pressure within the subassembly. However, to ensure that the piston is not driven from the chamber wall, there is provided a retention lip 48 extending radially inward about the periphery of the second end of the chamber wall 38, which is closest to the second end 18.

For certain types of monopropellant, such as the preferred HAN, the monopropellant is corrosive. Where a corrosive monopropellant such as HAN is used, the tank subassembly 44 (or housing 12) is formed in a manner to avoid compromise by corrosion. For example, some or all of the elements may be formed of materials unaffected by the monopropellant, such as plastic. In the embodiment of FIG. 1 the chamber wall 38 and end wall 40 are formed of plastic components sealed together, as by welding. The piston 24 and stem 34, however, are shown as metal components. Such metal components will need to be coated, such as with Teflon®, for protection from the corrosive monopropellants.

For each of these arrangements there is typically a need to seal the piston 24, and the piston alignment means 32, against leakage of the fluid monopropellant. The piston 24 may be sealed by the use of a standard O-ring 50 held within a peripheral groove in the piston. Similarly, an O-ring 52 may reside in a groove in the stem opening 42 to seal against the stem 34. While a similar seal could be used instead in the stem aperture 36, the possibility of the monopropellant leaking between the end wall 40 and first end cap 20 points toward the need for the seal at the end wall 40. Other sealing arrangements are of course available.

While the formation of such a tank subassembly 44 is preferred, it is not required. For example, the piston could be retained against movement toward the second end 18 by an appropriate element. This could be a tube (not shown) extending between the second end cap 22 and the piston 24, and/or a C-clip retained within a peripheral groove (not shown) on the interior face of the sidewall 14 (or exterior face of stem 34), or other known elements. Providing the first end cap 20 with a seal for the stem 34 and a fill valve would then permit the monopropellant to be introduced directly into the housing.

With either method, the first end cap 20 is fixed to the sidewall 14, the tank subassembly 44 (or piston 24) is placed in the housing, and the second end cap 22 is fixed to the sidewall 14 to thus assemble the inflator 10. Variations may of course be made in this process. For example, the housing may be formed from impact extruded alumninum (or other processed material) such that the first end cap 20 (or second end cap 22) is a monolithic extension of the sidewall 14, and thus no assembly is required between these components. Alternatively, the end cap(s) could be fixed to the sidewall 14 using inertia, laser, or other types of welding. In the preferred arrangement however, at least one, and most preferably both, of the end caps are fixed to the sidewall 14 using swaging.

Specifically, each of the end caps include a peripheral rounded section 54 facing outward of the inflator. The respective ends of the sidewall 14 may then be formed over these rounded sections by swaging to form an effective bond and seal. This swaging does, however, exert longitudinal forces upon the end caps, tending to force them longitudinally inward. To effect the swaging, it is therefore necessary to prevent this movement of the end caps.

This may be advantageously achieved by the use of the tank subassembly 44 and a spacer 56. In particular, the chamber wall 38 of the tank subassembly 44 will abut against the first end cap 20 (possibly via the end wall 40, as shown), and the spacer 56 will be placed intermediate the chamber wall 38 and second end cap 22. The respective longitudinal ends of the spacer 56 will therefore abut against both the chamber wall 38 and the second end cap 22. The chamber wall 38 and spacer 56 (possibly together with the end wall 40) therefore form a rigid span between the end caps, serving to hold the end caps against the longitudinal movement.

Since the spacer 56 extends between the chamber wall 38 (and more particularly the piston 24) and the second end cap 22, it passes through the combustion chamber 28. The spacer is therefore preferably formed to avoid interference with the combustion process. In the embodiment shown, the spacer has a generally tubular form closely corresponding to the interior of the sidewall 14 over most of its length for this reason. To provide the proper strength during swaging, and to withstand the combustion, the spacer is preferably formed of steel or other metal.

To cause this combustion in the combustion chamber 28, the monopropellant 30 must pass from the fuel supply chamber 26 to the combustion chamber 28. This is achieved by the use of a plurality of injection ports 58 extending through the piston 24 (the size of the ports being exaggerated in the figures). The ports 58 are small conduits through which the monopropellant 30 may flow. In use, the flow though the ports will be rather fine, and somewhat similar to a shower head. As used hereafter, the term "flow" to describe the monopropellant 30 exiting from each injection port 58 will be understood to encompass a "spray" form of flow.

Figure 2:
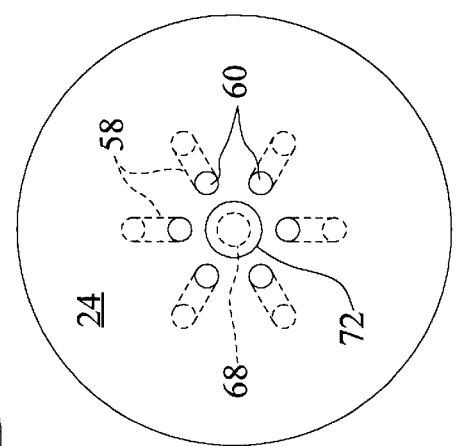
FIG. 2 is a plan view along line 2—2 of FIG. 1.

To achieve the desired flow it may be possible to drill or forge the ports 58 through the piston. It may be desirable, however, to form the piston with large openings (not shown) which are plugged with precision nozzles (not shown). These nozzles would then include injection ports 58. With either method the number and size of the injection ports 58 may be varied to provide the proper combustion profile for a particular use. As best shown in FIG. 2, the ports 58 may be advantageously arranged in a circular pattern about the center of the piston 24.

Figures 8, 9:
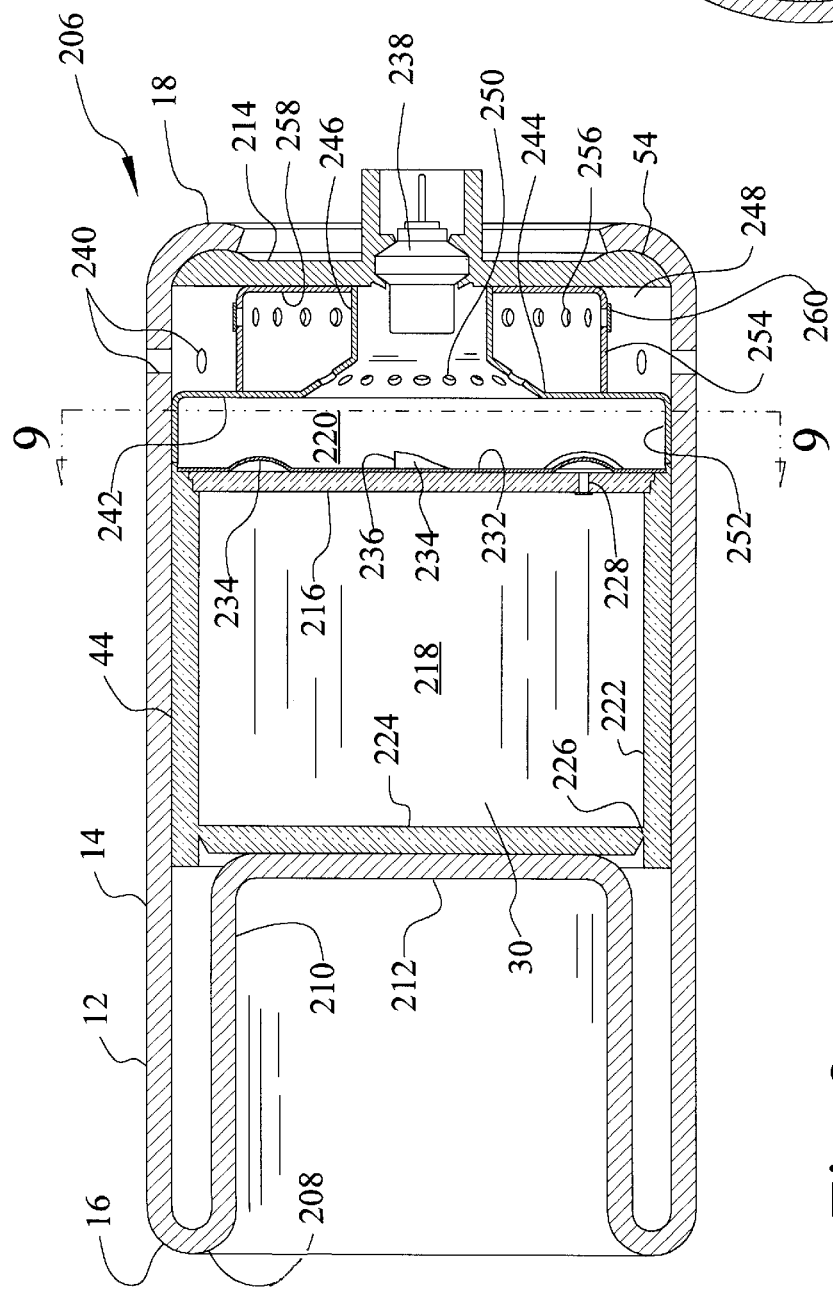
FIG. 8 is a side view in partial cross-section showing an inflator according to a fourth embodiment of the present invention.
FIG. 9 is a cross-sectional view along line 9—9 of FIG. 8.

To prevent flow until the inflator 10 is activated, the injection ports 58 are releasably blocked. In particular, means 60 are provided to seal the ports against flow of monopropellant below a predetermined pressure of the monopropellant. In other words, this seal means 60 will block the flow of the monopropellant through the ports while the monopropellant is below the predetermined pressure. When the monopropellant reaches the predetermined pressure, however, the seal means 60 will fail, and the monopropellant may flow. This seal means may take various forms, such as a layer of plastic and/or foil bonded over the ports (as shown in FIG. 8), or a mass of material, such as silicone, plugging the port (as shown in FIG. 1).

The seal means 60 thus serves to block movement of the piston 24 toward the first end 16 prior to activation. As may be envisioned, the blocked ports 58 and piston 24 together define a wall. When this wall moves toward the first end 16, the volume in the fuel supply chamber 26 is reduced. Since the amount of monopropellant 30 remains the same, the reduced volume causes the pressure of the monopropellant 30 to rise. This pressure exerts a force against the piston, opposing further movement toward the first end 16.

Prior to activation of the inflator, the motion of the vehicle may cause the piston to move due to inertia. While it is preferred that the O-ring 50 (and O-ring 52) would be sufficiently tight to prevent such casual movement, even if such movement occurred, the increase in pressure of the monopropellant would halt the piston 24, and possibly move it back to its original position. This is because the pressures created in the monopropellant due to such casual movement would be below the predetermined pressure, and the seal means 60 would remain in effect.

During activation of the inflator 10, however, the pressure within the monopropellant exceeds the predetermined pressure, forcing the monopropellant 30 to flow through the injection ports 58. To create this increased pressure in the monopropellant 30, an increased pressure is created in the combustion chamber 28. Specifically, the inflator 10 is provided with means for creating increased pressure and heat within the combustion chamber 28, with this increased pressure and heat being sufficient to both overcome the seal means 60 and to ignite the monopropellant 30 which flows through the piston 24 into combustion chamber 28.

This means for creating pressure and heat will preferably take the form of an initiator 62 (often referred to as a squib), and possibly an associated mass of ignition material 64. As is known in the art, initiators receive an electrical signal (such as from a collision sensor, not shown) and in response create a brief flash of high temperature, and possibly a quantity of gas. This may be sufficient to increase the pressure within the fuel supply chamber 26 without more. However, the addition of the ignition material 64 is often required. The ignition material 64 may take the form of a pyrotechnic material (granular, pelletized, powdered, etc.) placed to be ignited by the initiator 62. The additional gas and heat produced by the ignition material 64 acts in the same way to increase the pressure and temperature in the combustion chamber 28.

The means for creating pressure and heat may be located at various positions in communication with the combustion chamber 28. For example, this means could extend through the sidewall 14 in the combustion chamber 28. In the embodiment of FIG. 1, the means is located in the piston 24.

Specifically, the stem 34 is formed with a concave initiator chamber 66 opening onto the free end of the stem. Further, the piston 24 includes an ignition port 68 extending therethrough and communicating with the initiator chamber 66. The initiator 62 is mounted within the initiator chamber 66, such as by a mounting plug 70 threaded into the free end of the stem 34. If used, the ignition material 64 will also be housed within the initiator chamber 66. To prevent the loss of the ignition material 64, the ignition port 68 may be sealed by a frangible disc 72, preferably formed of plastic and/or foil bonded over the port.

As may be envisioned, when the initiator 62 is activated, the heat and pressure will flow through the initiator chamber 66, out of ignition port 68 and into the combustion chamber 28. If present, the ignition material 64 will be ignited, and will produce hot gas which also flows through the port into the chamber 28. The addition of the gas, along with the increase in temperature of the gas already present in the combustion chamber 28, will increase the pressure in the combustion chamber 28. This will in turn force the piston 24 in the direction of the first end 16.

As noted above, this will increase the pressure of the monopropellant 30. Further, as the forces on the piston reach equilibrium, the pressure of the monopropellant 30 will be slightly greater than that in the combustion chamber 28. This is because of the presence of the stem 34, which reduces the surface area of the piston in the side facing the fuel supply chamber 26. Thus, to create a sufficient force to oppose the pressure in the combustion chamber 28, the monopropellant 30 must be at a pressure higher than that in the combustion chamber (this higher pressure, multiplied by the smaller surface area, resulting in a force equal to that applied by the lower combustion chamber pressure, multiplied by the larger piston area). This higher pressure of the monopropellant 30 is designed to be above the predetermined pressure, and thus ruptures the seal means 60, and causes the monopropellant 30 to flow (more accurately, spray) into the combustion chamber 28.

Due to the high temperature in the combustion chamber, which is above the combustion temperature for the monopropellant 30, the monopropellant 30 injected into the combustion chamber 28 begins to combust. As in the case of HAN, the increased pressure in the chambers 26 and 28 may also be a necessary factor in the ability of the monopropellant 30 to combust. During this combustion the monopropellant 30 will form primarily nitrogen gas, along with trace amounts of water (in the form of steam). This combustion and formation of gas will further increase the temperature and pressure within the combustion chamber 28.

This increase in pressure within the combustion chamber 28 will act as before to force the piston 24 further toward the first end 16. Also as before, this will further compress the monopropellant 30, and cause it to continue to spray from the injection ports 58 into the combustion chamber 28. This further monopropellant 30 will thus combust within the combustion chamber 28, increasing the pressure (and likely temperature), and therefore continuing to drive the piston further. This again causes the monopropellant 30 to continue to spray from the injection ports 58, and so on. This continuing process of combustion pressure causing flow, and flow causing combustion pressure is self sustaining, and is the reason inflators of this type are referred to a "regenerative."

The gas produced during this regenerative combustion process is used to inflate the cushion (not shown) of the airbag system. As such, the gas must be able to flow from the combustion chamber 28 out of the inflator 10. To this end, the housing is provided with at least one exit port 74 extending therethrough to connect the combustion chamber 28 and atmosphere. While the port(s) could be formed through the sidewall 14, in the embodiment shown it is preferred that a single exit port 74 extend through the second end cap 22. The port(s) 74 will permit a sufficient flow of gas to inflate the cushion within the desired time, but will restrict gas flow sufficiently (i.e., throttle) to maintain the pressure within the combustion chamber 28. To better distribute the gas flow from the port(s), the inflator may be provided with a diffuser 76 mounted over the exit port 74. For example, the second end cap 22 may include a circular mounting wall 78 coaxial with the exit port 74, and the diffuser 76 may be formed as a cup. The lip of the cup may be surrounded by (or surround, as shown) the mounting wall 78, and the two be joined by welding. The cup wall would include numerous ports through which the gas would be dispersed.

While the above description is sufficient for a basic regenerative inflator, various improvements may be desirable. For example, the preferred HAN requires high pressure before it is combustible. It may therefore be desirable, or necessary, to provide a frangible combustion seal 80 interposed between the combustion chamber 28 and the atmosphere. The combustion seal 80 will rupture at a predetermined combustion pressure, which is on the order of the pressure necessary to combust the HAN. As such, during the initial stages of the regenerative process the pressure in the combustion chamber 28 will build due to the presence of the combustion seal 80, rather than have the combustion gas immediately exit the exit port 74.

A further improvement in this embodiment is a fuel combustion arrangement which enhances the initiation of the regenerative combustion process. As noted above, it is sometimes difficult to maintain the regenerative combustion process after the activation of the initiator 62. This may be due to incomplete combustion of the monopropellant 30 which initially enters the combustion chamber 28. Such incomplete combustion would not generate sufficient pressure to cause the monopropellant 30 to continue to flow into the combustion chamber 28, causing the regenerative combustion process to halt prematurely.

To avoid this, the present invention includes means to increase initial combustion of the monopropellant 30 by focusing the flow or spray of the monopropellant 30 (shown in FIG. 1 by phantom lines) into a localized volume 82, typically a common point. This localized volume is preferably in direct communication with (i.e., in the path of) the output from the initiator 62. Further, this localized volume is most preferably partially contained in order to limit egress of the flow or spray from the localized volume.

To focus the flow or spray of the monopropellant 30 into a localized volume, the injection ports 58 are formed such that they are trained or directed to spray in a predetermined direction, with respect to the piston 24, within the combustion chamber 28. Specifically, rather than each port 58 producing a flow or spray parallel to the longitudinal axis, each will produce a spray oriented to reach the localized volume. While not required, it is preferred that spray from all ports 58 intersect at a common point with respect to the piston 24. For the circular array of injection ports 58 shown in this embodiment, this will result in a conical configuration for the combined flows or sprays.

Focusing the sprays from the injection ports 58 to the localized volume 82 serves to concentrate the monopropellant 30. When the monopropellant 30 combusts, the concentration at the localized volume 82 will create a localized increase in temperature, or "hot spot" in the combustion chamber 28. The increased temperature at the localized volume 82 will serve to increase the combustion efficiency at the localized volume 82, with this increased combustion in turn creating more heat, and so on. This effect is believed to be most pronounced during the initial stage of inflator activation, when the piston has moved the least, and the localized volume has therefore moved the least. However, by combusting more of the monopropellant 30 during the initial stages, greater pressure and heat is initially produced, and the probability of sustaining the regenerative process is increased.

This may be further enhanced by defining the localized volume 82 to be in the path of the output from the initiator 62. This output is the hot gas (possibly augmented with the gas from the ignition material 64), which is sufficiently hot to cause ignition of the monopropellant 30. As such, directing this output into the localized volume 82 may serve to ensure combustion of the monopropellant 30 at the localized volume 82. This output does, however, have substantial velocity. As such, it may tend to disperse the monopropellant 30 from the localized volume 82, reducing the desired effect.

A further option is available to enhance the combustion at the localized volume 82. This option is to provide an isolation cup 84 into which the localized volume 82 may be projected. Specifically, the isolation cup 84 is located within the combustion chamber 28 and includes a concavity 86 opening onto the injection ports 58. To withstand the environment in the combustion chamber 28, the isolation cup 84 is preferably formed of metal, such as impact extruded aluminum, or appropriately formed steel.

The isolation cup 84 is positioned such that the spray streams from the injection ports 58 enter the concavity 86, and form the localized volume 82 within the concavity 86. By its concave nature, the concavity 86 blocks the monopropellant 30 from flowing in all directions, and thus serves to contain the monopropellant 30. The isolation cup 84 is also preferably positioned such that it is in the path of the output of the ignition material 64, as in the previous arrangement.

As may be envisioned, the use of the isolation cup 84 will thus serve to restrict the localized volume 82 against outward flow, ensuring even fuller combustion of the monopropellant 30. The one direction which is open is toward the piston. However, the spray streams are entering the isolation cup 84 from the piston, and thus these spray streams assist in keeping the monopropellant 30 within the isolation cup 84. This arrangement may therefore be particularly suited to forming a localized increase in temperature, or "hot spot" in the combustion chamber 28.

The isolation cup 84 may also be used to provide a partial bulk loading of the monopropellant 30. Specifically, a quantity of the monopropellant 30 (not shown) could be held in the isolation cup 84, with a layer of foil and/or plastic (not shown) covering the isolation cup 84 and sealed, for example, to the free edge of the cup. The output of the ignition material 64 would be directed into the isolation cup 84, and thus against the foil. This output would burn through the foil and ignite the quantity of monopropellant 30, creating the "hot spot" in the combustion chamber 28.

As may be seen, these arrangements can serve to increase the combustion during the initial stages of inflator activation. Since the piston will travel during the combustion process, the advantages of these arrangements may soon be lost, especially with the isolation cup 84. However, at least during the initial moments of activation, these arrangements can serve to increase the combustion and pressure within the combustion chamber, and increase the probability that the regenerative cycle will continue.

Figure 3:
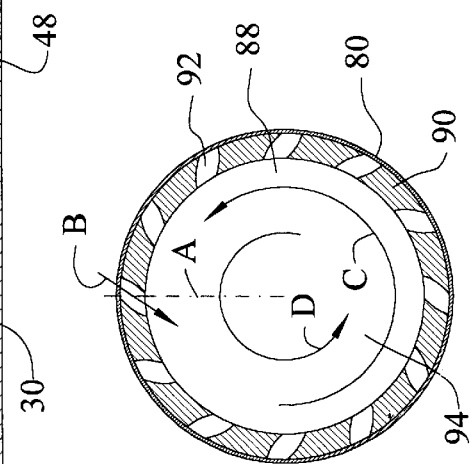
FIG. 3 is a cross-sectional view along line 3—3 of FIG. 1.

A further arrangement for increasing the combustion of the fuel is shown in FIGS. 1 and 3. While the previous arrangement sought to increase initial combustion to ensure the starting of the regenerative cycle, this second arrangement seeks to increase combustion throughout the regenerative cycle by increasing the residence time of the monopropellant 30 within the inflator. Specifically, this arrangement seeks to increase the length of the path the monopropellant 30 travels from the piston 24 to the exit port 74, such that the monopropellant 30 spends more time in the inflator 10 before passing through the exit port 74. As noted above, the preferred HAN monopropellant will not combust unless pressurized, so any uncombusted HAN flowing out of the inflator, and into the (relatively low) atmospheric pressure, will not further combust, wasting the monopropellant and decreasing the efficiency of the inflator. By increasing the residence time the amount of HAN actually combusted is therefore increased.

For this improved arrangement the inflator 10 is provided with a swirl chamber 88 located between the combustion chamber 28 and exit port 74. The swirl chamber 88 is formed by a generally tubular peripheral wall 90 located within the combustion chamber 28. Extending through the peripheral wall 90 are a plurality of entrance ports 92 providing access to the swirl chamber 88, and the exit port 74 opens onto the swirl chamber 88 to provide egress therefrom. The swirl chamber 88 is elongated along the longitudinal axis, and very preferably circular in longitudinal cross-section. A first end 94 of the swirl chamber 88 is preferably hemispherical. A second end 96 of the swirl chamber 88 is preferably formed as a truncated annulus, with the inner diameter containing the exit port 74, as shown in FIG. 1. The entrance ports 92 are located intermediate the first and second ends 94 and 96, and preferably closer to the second end 96.

As may be envisioned, the gas produced by the combustion of the monopropellant 30, and any droplets of monopropellant 30 still in the process of combustion which are entrained in the gas, will pass through the entrance ports 92 into the swirl chamber 88 and then out the exit port 74. If desired, the combustion seal 80 may be placed over the entrance ports 92, as shown, to thus seal the exit port 74 from the combustion chamber 28. This will permit the pressure in the combustion chamber 28 to rise to a greater level, since the gas can not initially expand into the swirl chamber 88. When the pressure has risen to a sufficient extent to continue the regenerative process, the combustion seal 80 will rupture under the pressure, and permit the gas to flow into the swirl chamber 88.

In an important aspect of the invention, a longitudinal axis through any one of the entrance ports 92 is not normal to the longitudinal axis of the inflator, but rather is angled or directed toward the first end 94, such that the gas flowing into the swirl chamber 88 will initially flow away from the exit port 74. This is best shown in FIG. 1. As may be envisioned, the gas flow will thus move from the entrance ports 92 to the first end 94. The gas flow will then turn, and move back toward the second end 96 and through the exit port 74. This will clearly increase the distance the gas travels, thus increasing the residence time of the gas (and more particularly any entrained drops of monopropellant 30). Further, the change in direction required at the first end 94 may slow the gas flow, thus further increasing the residence time.

The swirl chamber 88 will therefore serve to increase the efficiency of the inflator by increasing the amount of monopropellant 30 actually combusted in the inflator. This efficiency may be further increased, however, by yet a further modification.

Specifically, the entrance ports 92 may be formed such that, in addition to being angled toward the first end, they are also angled with respect to radial. This is best illustrated in FIG. 3, where a radial line A passing through a entrance port 92 is seen to form an angle with an arrow B indicating gas flow into the swirl chamber 88. The entrance ports 92 are preferably formed such that this angle is the same for all entrance ports 92. This arrangement will thus cause the gas to flow around the periphery of the swirl chamber 88, in a swirling manner illustrated by arrow C.

However, since the entrance ports 92 are also directed toward the first end 94, the arrow C in FIG. 3 is actually helical, and extends toward the first end 94. As may be envisioned, the helical path generated by this angle with respect to radial is longer than a straight path, and thus increases the residence time of the gas. The use of the hemispherical and annular section shapes for the ends 94 and 96 may assist in this. Specifically, the hemispherical first end 94 may smoothly direct the gas flow inward, creating an inner region of helical gas flow toward the second end 96, with this gas flow being represented by arrow D in FIG. 3. The flows of arrows C and D are therefore in the same rotational direction, but different longitudinal directions.

The exit port 74 is of course centered within the second end 96 if the preferred annular section shape is employed, and the gas flow D will thus pass through the exit port 74. For that portion of the flow D which does not flow through the exit port 74, the annular section shape of the second end 96 will cause the gas flow to move outward and change longitudinal direction. This redirected flow may thus merge smoothly with the additional flow entering through the entrance ports 92, and serves to reinforce the helical flow path C.

As may be seen, the swirl chamber 88 may appreciably increase the length of the path traveled by the gas within the inflator 10, and thus the residence time of the gas. This in turn increases the efficiency of the inflator 10.

The swirl chamber 88, with its curved interior ends, may be formed by a variety of different methods. For ease of construction and assembly, however, it is preferred that the peripheral wall 90 be split. In other words, a base piece 98 may be formed, such as by impact extrusion, or other suitable methods. The base piece will include a section of the peripheral wall 90, and the second end 96. An end piece 100 can also be formed (using the same methods) which includes the remainder of the peripheral wall 90 and the first end 94. The free ends of these pieces (containing the sections of peripheral wall 90) may then be secured together. For example, they may be formed with a mating shoulder 102 which is welded (such as by laser welding). This will permit the swirl chamber 88 to be formed in the desired complex shape without the need for costly and complicated forging or machining.

Further, the base piece 98 may include a peripheral foot 104 extending from the outer diameter, adjacent the second end 96. The spacer 56 may then include a reduced diameter section 106, which fits closely over the peripheral wall 90, but is smaller than the peripheral foot 104. The spacer 56 will thus press the peripheral foot 104 against the second end cap 22, securing the base piece 98 and end piece 100 within the inflator. This arrangement eliminates the need for an additional weld or fastener to secure the swirl chamber 88, thus reducing cost and assembly time.

It is noted that the two arrangements described above are not exclusive, but may be used together. The angled injection ports 58 may thus be used with the swirl chamber 88 to ensure both the start of the regenerative cycle and the efficient use of the fuel during the cycle. Further, concavity 86 may be employed also if desired. As shown in FIG. 1, the concavity 86 may even be formed as an extension of the end piece 100, eliminating the need for assembly of the two components. The use of double-impact extrusion is preferred for the formation of such a modified end piece.

With reference to FIGS. 4 and 5 there is shown a further arrangement to increase inflator efficiency. This arrangement is shown in the context of a further inflator configuration. This new configuration will be described first.

With reference to FIG. 4, the second embodiment of an inflator according to the present invention is generally designated by reference numeral 108. As in the first embodiment, the inflator includes a housing 12 which includes a sidewall 14 having a first end 16 and second end 18. Also as before, the sidewall preferably takes the shape of a cylindrical tube, but other cross-sectional shapes may be employed. The sidewall again defines a longitudinal axis (not shown) extending between the first and second ends.

In this embodiment, it is preferred that the first end 16 be closed by an integral extension of the sidewall 14. Specifically, an annular first housing wall 110 has its outer diameter connected to the sidewall 14. The inner diameter of the first housing wall 110 mounts an abutment tube 112 which extends toward the second end 18. Both the first housing wall 110 and abutment tube 112 are preferably formed integrally (i.e., monolithically) with the sidewall 14, such as by an impact extrusion or drawing and forming process. Alternatively, the first housing wall 110 could be a separate end cap secured to the sidewall 14, with the abutment tube 112 formed together with the first housing wall 110 or as a separate element secured thereto.

Before proceeding further, it is noted that the abutment tube 112 forms an end flow passage 114 through its inner diameter, and that this end flow passage 114 communicates with the atmosphere (i.e., the exterior of the housing 12). The housing further includes a second end cap 116 secured to the second end 18. As in the first embodiment, it is preferred that the second end cap 116 have a peripheral rounded section, with the second end 18 swaged over the second end cap 116. Alternatively, the second end cap 116 could be secured by welding, or could be a monolithic extension of the sidewall 14.

The sidewall 14, first housing wall 110 and second end cap 116 define an interior of the housing 12. Mounted within this interior is a piston 118, again oriented substantially normal to the longitudinal axis of the housing. The piston divides the interior into a fuel supply chamber 120 and a combustion chamber 122. Within the fuel supply chamber 120 there is stored a quantity of fluid monopropellant 30. As before, this monopropellant 30 is preferably HAN.

The piston 118 is mounted for movement toward the first end 16, and includes the piston alignment means 32. In this embodiment, the piston alignment means 32 preferably takes the form of a peripheral skirt 124 extending from the outer periphery of the piston 118 toward the first end 16. The outer diameter of the peripheral skirt 124 slides closely within the inner diameter of the sidewall 14, maintaining the proper orientation of the piston 118. As shown, the piston and skirt may be formed as a monolithic unit.

In this embodiment it is again preferred that the piston (with skirt) and fuel supply chamber 120 be capable of insertion into the housing as a single unit. For this, there is provided an end wall 126 having an outer diameter received within the peripheral skirt 124, adjacent the rear, free edge of the skirt. This end wall may include an fill hole (not shown) similar to the first embodiment. The end wall 126 in this embodiment is annular, similar to a washer, with a gas opening 128 extending therethrough. A gas tube 130 extends from this gas opening 128 toward and through the piston 118, which includes a tube opening 132 to permit such. It is preferred that the end wall 126 and gas tube 130 are formed as a monolithic unit, as shown. A free end 134 of the gas tube 130 is supported in a blind cavity in the second end cap 116, in a manner described more fully below.

With this arrangement, the fuel supply chamber 120 is defined by the piston 118, end wall 126 and gas tube 130, such that it has a tubular or annular shape. Additionally, with the preferred skirt 124, these components together define a tank subassembly 44. To prevent leakage of the monopropellant 30 it is preferred to provide an appropriate seal at the outer peripheral edge of the end wall 126, and on the inner edge of the tube opening 132 in piston 118. If the peripheral skirt 124 is not employed, a seal would also be preferred between the outer periphery of the piston 118 and the sidewall 14. As may be seen, this arrangement as shown provides a completed tank subassembly 44 which may be assembled at a remote location, and then placed within the housing 12 as a complete unit.

Movement of the piston toward the second end 18 is again a concern, and to prevent this the peripheral skirt 124 may be provided with an inwardly extending peripheral shoulder 136 against which the end wall 126 abuts. This peripheral shoulder 136 may be tapered as shown to permit the end wall 126 to be forced there past into position. If the peripheral skirt 124 is not employed, an appropriate groove (not shown) may be formed into the inner face of the sidewall 14, and a C-clip inserted therein to block forward movement of the piston 118. Other arrangements are of course possible.

In the assembled position the end wall 126 will abut against the abutment tube 112, with the gas opening 128 in communication with the end flow passage 114. As noted above, the tube opening 132 is received within a blind cavity in the inner face of the second end cap 116. The abutment of the tube opening 132 against the end cap will thus prevent further movement of the end cap, permitting the second end 18 of the sidewall 14 to be swaged over the second end cap 116. The tank subassembly 44 itself therefore serves as the rigid span permitting swaging in this embodiment.

To permit the monopropellant 30 to flow or spray into the combustion chamber 122, the piston 118 will again include a plurality of injection ports 138. As before, the injection ports may be drilled, presses, formed or molded within the piston 118, or may be formed by larger holes plugged with precision ports. Also as before, the ports will preferably be arranged in a circular pattern about the longitudinal axis. The injection ports 138 will again be initially blocked by a layer of foil or film (not shown), or by a plug of silicone or other suitable material (not shown). As may be envisioned, movement of the piston toward the first end 16 will increase the pressure within the fuel supply chamber 120, and rupture the film covering (or eject the blocking material within) the injection ports 138 to cause flow of the monopropellant 30 into the combustion chamber 122.

The force to cause this rearward movement of the piston 118 is again provided by increased pressure in the combustion chamber 122 due to an initiator 140, and possibly an associated mass of initiator material 142. As before, the initiator 140 could be mounted through the sidewall 14, but it is preferred that the initiator be mounted within the second end cap 116. Specifically, the second end cap 116 includes an initiator cavity 144 opening to the exterior of the inflator 108. The initiator 140 is fixed within this cavity 144, such as by crimping, possibly with the initiator material 142 surrounding, as shown. This initiator cavity 144 may require a depth greater than necessary for the other sections of the second end cap 116, thus resulting in a cap protrusion 146.

This cap protrusion 146 may advantageously be used as the location of the cavity receiving the free end 134 of gas tube 130, as shown. This arrangement thus reduces the amount of material required to form these components. To permit the hot gas produced by the initiator 140 to enter the combustion chamber 122, a plurality of ignition ports 148 pass through the cap protrusion 146 to link the initiator cavity 144 with the combustion chamber 122. To prevent the initiator material 142 from falling through the ignition ports 148, the ignition ports 148 may initially be sealed by an appropriate film or foil (not shown).

As may be envisioned, activation of the initiator 140 will cause hot gas to flow into the combustion chamber 122, increasing the pressure within the combustion chamber 122. This will drive the piston 118 back toward the first end 16, compressing the monopropellant 30 in the fuel supply chamber 120 and increasing its pressure. In the embodiment shown, the peripheral skirt 124 causes the fuel supply chamber 120 to have a smaller area than the face of the piston 118 on the combustion chamber side, and as such the pressure within the fuel supply chamber 120 will be greater than the pressure within the combustion chamber 122. This pressure differential will be sufficient to cause the monopropellant 30 to flow through the injection ports 138 into the combustion chamber 122. The droplets of monopropellant 30 will there encounter the hot gas from the initiator 140, and will combust, further increasing the pressure within the combustion chamber 122, and driving the regenerative cycle described above.

This cycle will again produce the inflation gas. To permit this inflation gas to reach the cushion (not shown), the gas tube 130, at a position intermediate the piston 118 and cap protrusion 146, will include a plurality of inlet apertures 150. These inlet apertures 150 may initially be covered by a film or foil 152 to permit the pressure within the combustion chamber 122 to rise sufficiently to maintain the regenerative cycle. Once the desired pressure is reached in the combustion chamber 122, however, the foil 152 will rupture, and the inflation gas will flow into the gas tube 130. The inflation gas will then flow toward the first end 16, through the end flow passage 114, and exit the inflator 108. This will continue until the piston 118 has moved fully against the end wall 126 to exhaust the supply of monopropellant 30. In this regard, it is noted that the length of the peripheral skirt 124 extending beyond the end wall 126 will require that the abutment tube 112 have an appropriate length such that the skirt in its movement is not blocked by the first housing wall 110. Finally, to provide a more desirable gas flow, a diffuser 154 may be mounted on the first housing wall 110 in covering relation to the end flow passage 114.

As may be seen, this arrangement will provide a desired quantity of inflation gas. However, as in the first embodiment, the basic flow path from the injection ports 138 to the diffuser 154 is relatively short. As such, the monopropellant 30 may not fully combust before reaching the low pressure outside the diffuser. A modification is therefore preferred which will increase the length of the flow path.

Specifically, the injection ports 138 are preferably not arranged parallel to the longitudinal axis, but instead are angled to a tangent, as best illustrated in FIG. 5. More particularly, each of the injection ports 138 includes an inlet 156 at the fuel supply chamber 120 and an outlet 158 at the combustion chamber 122. For each injection port 138, the outlet 158 is offset from the inlet 156 by an angular extent E about the longitudinal axis. This angular extent E is preferably the same for each of the injection ports 138.

As may be envisioned, the monopropellant 30 flowing into the combustion chamber 122 will thus have a swirl effect upon the gas within the combustion chamber 122, causing the entire contents of the combustion chamber 122 to move in a helical path. Such a helical path will of course be longer than a straight line, thus increasing the amount of time the monopropellant 30 remains in the combustion chamber 122, and ensuring greater combustion. If desired, the ignition ports 148 may have a similar offset to reinforce this effect.

As is evident from FIG. 4, the placement of the free end 134 of gas tube 130 in the cap protrusion 146 causes the inlet apertures 150 to be spaced from the second end cap 116. As such, the combusting fuel and generated gas has two possible paths: directly from the injection ports 138 to the inlet apertures 150; or from the injection ports 138 to the second end cap 116, then reversing direction to the inlet apertures 150. Since this second path is longer, and provides a greater residence time for increased combustion, it is preferred. To help reinforce this longer path, the inner face of the second end cap 116 may be provided with a peripheral tapered flange 160, as shown in FIG. 4. This flange, together with the cap protrusion 146 forms the inner face of the second end cap 116 as a truncated annulus, similar to element 96 in the first embodiment. This shape tends to force the flow from the injection ports 138 toward the second end cap 116 to swirl about the exterior of the combustion chamber 122, while the reverse flow from the second end cap 116 toward the inlet apertures 150 swirls about the interior of the combustion chamber 122. While the output from the initiator 140 (out of the ignition ports 148) may disturb this flow initially, it is noted that the flow from the ignition ports 148 occurs only during the start of the regenerative cycle, and ceases once the cycle is self-sustaining.

Figures 6, 7:
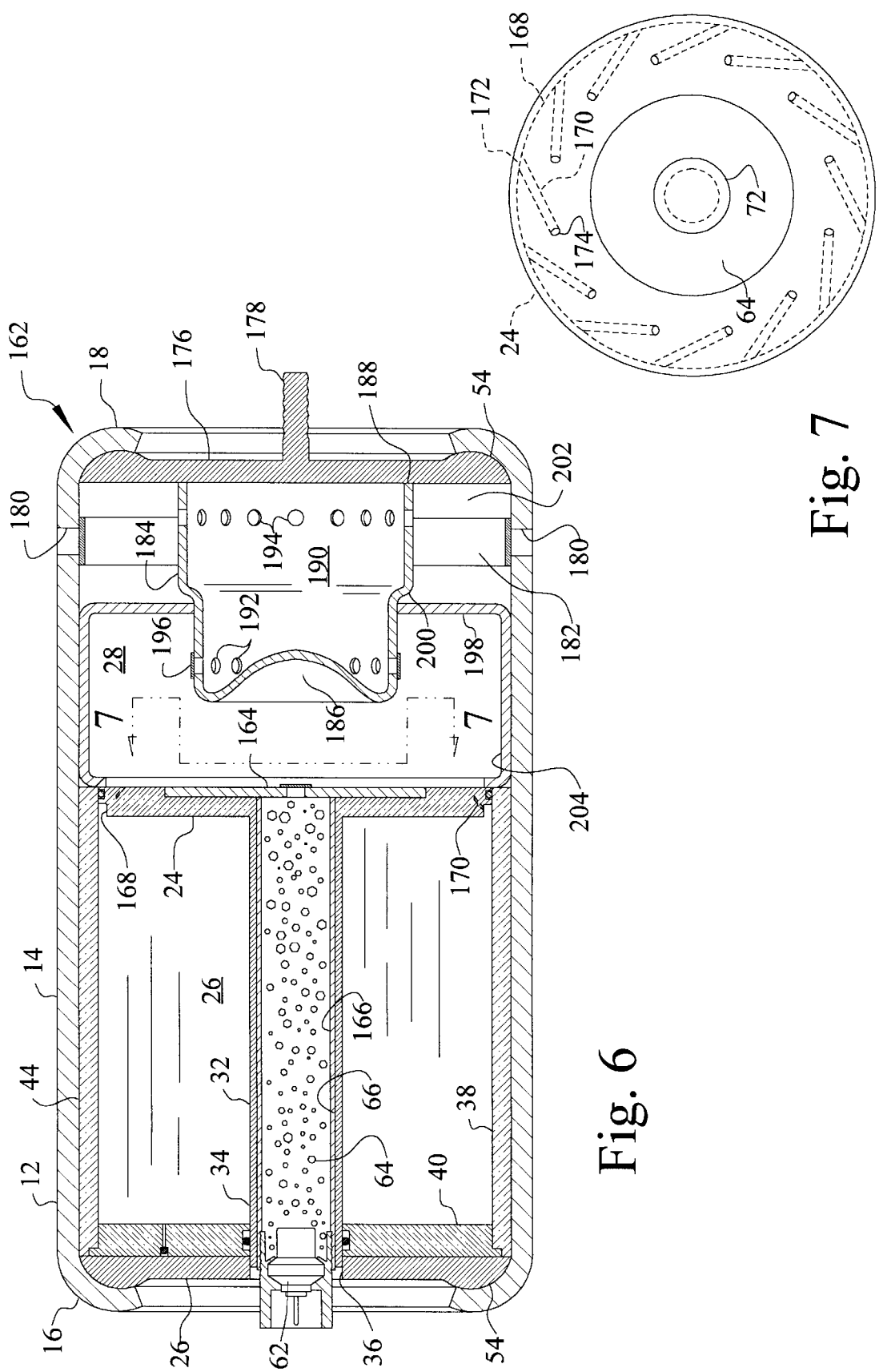
FIG. 6 is a side view in partial cross-section showing an inflator according to a third embodiment of the present invention.
FIG. 7 is a plan view along line 7—7 of FIG. 6.

With reference to FIGS. 6 and 7, a third embodiment of an inflator according to the present invention is generally designated by reference numeral 162. This embodiment has many components similar to the first embodiment of FIG. 1, and these similar components have like reference numerals. In view of the similarities to the first embodiment, only the differences in this third embodiment will be discussed.

A first difference is the presence of a metal face plate 164 on the surface of the piston 24 facing the combustion chamber 28, and a metal initiator tube 166 on the inner diameter of the initiator chamber 66. As noted above, the piston 24 and stem 34 are preferably formed of plastic for cost and corrosion resistance. However, these parts are subject to high temperatures from the combustion of the monopropellant 30 and initiator 62. To protect these parts from the high temperatures, the face plate 164 and initiator tube 166 may be used. These protective elements could be molded in place during fabrication of the piston/stem combination, or assembled after molding using adhesives, ultrasonic welding, etc. As shown, the face plate 164 does not cover the entire face of the piston 24, although it could if desired.

Another difference in this embodiment is the presence of a peripheral groove 168 along the piston 24, with the groove opening onto the fuel supply chamber 26. Further, the piston is provided with a plurality of injection ports 170 which have inlets 172 and outlets 174, and the inlets 172 are located in this peripheral groove 168. Finally, the injection ports 170 are not angled toward a common point, but are oriented on a tangent with the inlets and outlets angularly offset, similar to that in the second embodiment, and as best shown in FIG. 7. As in the second embodiment, this orientation will cause a swirling of the combusting monopropellant 30. The placement of the inlets in the peripheral groove 168 provides the inlets with the largest radial placement (i.e., closest to the sidewall 14). This in turn permits the largest radial placement for the outlets, resulting in a swirling flow tending to move toward the second end 18 along the radial exterior of the combustion chamber 28. The desirability of this will be apparent from the discussion below.

The structure between the piston 24 and the second end 18 is also modified in this embodiment. Specifically, the interior of the housing is closed at the second end 18 by a second end cap 176. This second end cap is similar to that in the first embodiment, in that it is generally planar, but does not include the exit port 74. Rather, the second end cap 176 may include a mounting bolt 178 extending therefrom for mounting the inflator within a vehicle, as is known in the art. The inflator does, however, include a plurality of exit ports 180, extending through the sidewall 14 adjacent the second end cap 176. These exit ports 180 may be initially covered with a film or foil 182 to maintain initial pressure within the combustion chamber 28, as in the previous embodiments, and as made clear by the following description.

While the above-described arrangement could be sufficient, it is preferred to increase the path traveled by the combusting fuel, and for this result a flow cup 184 is provided. The flow cup 184 is a concave member opening on to, and abutting against, the second end cap 176, such that the cup has a closed end 186 and an opening edge 188, with this opening edge abutting against the second end cap 176. This defines a flow chamber 190 within the cup 184. The flow cup 184 further includes a plurality of entrance holes 192 adjacent the closed end 186 and a plurality of exit holes 194 adjacent the opening edge 188. The combusting monopropellant 30 will flow through the entrance holes 192 into the flow chamber 190, and will then flow out of the exit holes 194, and then flow onward to the exit ports 180 to exit the inflator. The closed end 186 may be formed with an opposite concavity, as shown, to help direct the flow from the entrance to the exit holes. As with the exit ports 180, the entrance holes 192 and/or exit holes 194 may include a film or foil 196 to increase initial pressure, similar to that described above.

As may be seen, to ensure that the combusting monopropellant 30 passes through the flow chamber 190, it is necessary to block the flow path to force the desired flow. This is achieved by use of a blocking wall 198 extending across the interior of the inflator, at a position intermediate the entrance holes 192 and exit holes 194. This may be easily achieved by providing the flow cup 184 with a stepped diameter, thus forming a shoulder 200 intermediate the holes 192 and 194. The blocking wall 198 may then be provided with an aperture sized to abut against the shoulder 200. As may be seen, the presence of the blocking wall 198 serves to define a flow volume 202 between the blocking wall 198 and second end cap 176.

A particularly advantageous arrangement can be achieved if the blocking wall 198 abuts against the shoulder 200 such that the shoulder is intermediate the blocking wall 198 and second end cap 176. Specifically, the blocking wall 198 may then include a support section 204 extending toward, and abutting against, the piston 24. In this way the chamber wall 38 of the tank subassembly 44, the support section 204 and the flow cup 184 will together define a solid span between the first and second end caps, securing the end caps for the preferred swaging processes. Additionally, the piston 24 is simultaneously blocked against moving toward the second end cap 176.

In operation, the initiator 62 will fire to create the initial heat and pressure in the combustion chamber 28, moving the piston back and unblocking the injection ports 170. The injected monopropellant 30 will begin to combust, further increasing the pressure. When the pressure reaches a predetermined level, the foil 196 covering the entrance holes 192 will rupture, and the combusting monopropellant 30 will flow into the flow chamber 190. As noted, the flow will continue out of the exit holes 194 into the flow volume 202. When a sufficient pressure is attained, the foil 182 will rupture, and the inflation gas will flow from the exit ports 180.

The flow within the combustion chamber will of course include the swirling if the injection ports 170 are provided with the desired and shown orientation, thus increasing the flow path and residence time. It is noted, however, that the injection port arrangement of the first embodiment could also be employed. Specifically, forming the closed end 186 of the flow cup 184 with the concavity as shown also tends to form a concavity facing the piston 24 (at least when the flow cup 184 is formed of thin metal). This concavity could be used to retain a localized volume of the injected monopropellant 30, as in the first embodiment. Further, the inflators described herein are not limited to either localized volume or swirling flow, but may have a combination of both.

Specifically, the angle at which the injection ports 170 are oriented may be varied, and most specifically, may be reduced to a small angle. Such a small angle would result in the spray from the ports moving toward a localized volume; though not to the exact same point. This localized volume, while larger than that achieved with the first embodiment, could still be sufficiently localized to achieve a similar "hot spot" result. Further, the injection ports 170 would still have a slight tangential orientation, and would induce swirling, though less effectively. As such, the "hot spot" could be initially formed to help initiate the regenerative cycle, while later in the cycle the swirling effect would be more pronounced to increase the flow path and residence time. It may therefore be seen that these two injection port arrangements are not mutually exclusive, but part of a continuum of possible angular offsets.

Further, the flow cup 184 also serves to increase residence time. Specifically, the flow into the flow cup 184 is radially inward through the entrance holes 192. Within the flow chamber 190, however, the gas and entrained droplets of monopropellant 30 must change direction 180° to flow radially outward through the exit holes 194. This change in direction slows the gas flow, increasing the residence time, and thus the efficiency of the inflator.

With reference to FIGS. 8 and 9, an inflator according to a fourth embodiment of the present invention is generally designated by reference numeral 206.

This embodiment is generally similar to those previous, and includes a housing 12 with a (preferably tubular) sidewall 14 having a first end 16 and a second end 18. In this embodiment, as with the second, it is preferred that the first end 16 be closed by an integral extension of the sidewall 14. Also as with that second embodiment, an annular first housing wall 208 has its outer diameter corresponding to that of the sidewall 14, and an inner diameter. The inner diameter of the first housing wall 208 mounts an abutment tube 210 which extends toward the second end 18. Unlike the second embodiment, however, it is preferred that an abutment wall 212 close the end of the abutment tube 210. Each of the elements 208–212 are preferably formed monolithically with the sidewall 14, for example by an impact extrusion process. However, these elements could be separate components secured in place, as by welding.

The second end 18 is closed by a second end cap 214. While this end cap could be welded in position, as before it is preferred that it include the peripheral rounded section 54 and the second end 18 be swaged over this section. In this manner an interior of the inflator is defined. Again, mounted within this interior is a piston 216, oriented substantially normal to the longitudinal axis of the housing. The piston 216 divides the interior into a fuel supply chamber 218 and a combustion chamber 220. Within the fuel supply chamber 218 there is stored a quantity of fluid monopropellant 30. As before, this monopropellant 30 is preferably HAN.

The piston 216 is again mounted for movement toward the first end 16, and includes piston alignment means 32, preferably in the form of a peripheral skirt 222 extending from the outer periphery of the piston 216 toward the first end 16. The outer diameter of the peripheral skirt 222 slides closely within the inner diameter of the sidewall 14. As before, it is preferred that the piston 216 and fuel supply chamber 218 be capable of insertion into the housing 12 as a single unit. To this end there is provided an end wall 224 having its outer diameter received within the peripheral skirt 222, adjacent the rear, free edge of the skirt. This end wall 224 may include an appropriate fill hole (not shown) as in the first embodiment.

The piston 216, peripheral skirt 222 and end wall 224 therefore define the fuel supply chamber 218, and together define a tank subassembly 44. As before, it is desired to provide appropriate seals to prevent leakage of the monopropellant 30. While these components could be arranged similar to those shown in the second embodiment (FIG. 4), a less expensive arrangement is shown here.

Specifically, the peripheral skirt 222 and end wall 224 are formed together as a monolithic unit having shape of a cup. This permits both the skirt and end wall to be formed from a simple plastic injection molding operation. The piston 216 is then formed as a plastic disk (which may again be formed by inexpensive molding) and secured to the front end of the peripheral skirt 222, such as by welding or adhesives. This arrangement eliminates the need for O-ring type seals in the previous embodiments, thus reducing component costs and assembly costs.

It is of course necessary for the peripheral skirt 222 to slide with respect to the end wall 224 when the piston moves toward the first end 16. To permit this, the junction between the peripheral skirt 222 and end wall 224 is formed (during the molding operation) as a reduced thickness area 226. The thickness of area 226 is sufficient to prevent leakage before activation of the inflator. Additionally, unintended movement of the piston is also blocked by the presence of the area 226. However, the area 226 is sufficiently weak that the force acting on the piston during activation (which is transmitted through the skirt) will rapture the area, permitting the desired motion. Further, the fit between the end wall 224 and peripheral skirt 222 after this rupturing will still be sufficiently tight to prevent appreciable leakage of the monopropellant 30. As such, this arrangement provides a simple, easily constructed tank subassembly 44, at a reduced cost.

As in previous embodiments, the piston 216 includes a plurality of injection ports 228 extending therethrough. These injection ports 228 are initially blocked such as by a rupturable film or foil 230, or by a plug as described previously. Further, the preferred plastic piston 216 includes a metal face plate 232 on the side facing the combustion chamber 220. As in the previous embodiment, the face plate will serve to protect the plastic piston from the high temperatures during activation. The face plate of this embodiment also serves to induce swirling of the gas.

Specifically, the injection ports 228 are formed extending substantially parallel to the longitudinal axis of the inflator. The face plate 232 is of a size and/or shape to cover these ports. However, the portions of the face plate 232 which cover the injection ports 228 are at least bent or deformed to permit the flow of the monopropellant 30 to pass thereby. In the embodiment shown, the face plate 232 includes a vane 234 struck out from the face plate 232 in each of these covering portions. The vanes have an open end 236 formed by a slit in the material of the face plate 232 which is opened by the deformation of the material outward from the plane of the face plate 232. The remainder of the vane 234 is closed, forming a concavity ending at the open end 236.

The face plate 232 is located such that the injection ports 228 are within the vane 234, but spaced from the open end 236. As may be envisioned, monopropellant 30 flowing from the injection ports 228 will enter the interior of the vane 234. As the vane blocks longitudinal flow of the monopropellant 30, the monopropellant 30 flows along the vane toward, and through, the open end 236. This imparts a direction change in the monopropellant 30. In the embodiment shown, the vanes are oriented at tangents to the longitudinal axis. As such, the monopropellant 30 would exit from the vanes with these same tangential directions, resulting in a swirling of the monopropellant 30 within the combustion chamber 220. The particular angle of flow imparted may of course vary, from the purely tangential arrangement shown in FIGS. 8 and 9, to a focusing flow as in the first embodiment, shown in FIGS. 1 and 2.

This arrangement may provide advantages over the ports previously described. For example, the use of the face plate 232 can protect the plastic piston. Further, a common piston with standard injection ports 228 can be molded for all uses, and only the vane placement and shape need be modified for individual applications.

Continuing on, the inflator 206 will of course include an initiator 238 to begin the regenerative cycle. While placement on the sidewall 14 is possible, it is preferred that the initiator 238 be mounted in the second end cap 214, as shown. To permit the gas to escape the housing 12, a plurality of exit ports 240 are preferably provided in the sidewall 14 adjacent the second end cap 214, but could alternatively extend through the second end cap 214. Again, these exit ports could be initially covered by a rupturable film or foil (not shown) as described above. A tubular spacer (not shown) could then be mounted between the piston 216 and second end cap 214 to form a rigid span to secure the tank subassembly 44 in position and permit swaging of the sidewall 14 over the second end cap 214.

While such a spacer would be all that is required, it is preferred to provide an arrangement to further increase residence time to improve efficiency. A flow chamber as shown in FIG. 6 would be an acceptable arrangement, but a modification on that concept is provided for this embodiment.

Specifically, this embodiment includes a blocking wall 242 extending across the interior of the housing 12, at a position intermediate the piston 216 and exit ports 240. The blocking wall 242 will serve to define a flow volume 248 between the blocking wall 242 and second end cap 214. If the initiator 238 is mounted within second end cap 214, the blocking wall 242 includes an initiator opening 244 positioned over the initiator 238, and a barrier tube 246 extending between the blocking wall 242 and second end cap 214, in surrounding relation to the initiator 238. In this way the initiator 238 may still communicate with the combustion chamber 220. The barrier tube 246 (or blocking wall 242) will then include a plurality of entrance holes 250 extending therethrough. In the embodiment shown, the barrier tube 246 includes a tapered section, and the entrance holes 250 are located within this tapered section. To increase the pressure within combustion chamber 220 it may be desirable to provide a rupturable film or foil (not shown for clarity) over these entrance holes 250.

As may be envisioned, the gas and combusting monopropellant 30 will be forced to flow through the entrance holes 250, and then change direction to reach the exit ports 240. This will serve to slow the gas and increase residence time. Additionally, the outer periphery of the blocking wall 242 may advantageously be extended with a spacer 252 to abut the piston 216 and form a span to secure the tank subassembly 44 and second end cap 214, as noted above. Most advantageously, the entire spacer 252, blocking wall 242, barrier tube 246 combination may be formed from a single piece of stamped metal, reducing fabrication cost and providing for simple assembly.

While this arrangement increase residence time, further steps are preferred to increase residence time yet further. Specifically, a tubular diverter wall 254 may be placed within the flow volume 248 coaxially surrounding the barrier tube 246. This diverter wall 254 will include a plurality of exit holes 256. To maintain the diverter wall in position, an annular placement plate 258 may have its outer diameter secure to the diverter wall, and its inner diameter secured to the barrier tube 246. In the embodiment shown, the diverter wall 254 and placement plate 258 are formed monolithically as a cup shape, and the inner diameter of the placement plate 258 abuts against the barrier tube 246. The exit holes may also be initially blocked by a rupturable film or foil 260, as shown.

As may be envisioned, the gas flow must change direction to flow outward through the exit holes 256. Further, the exit holes 256 may be placed offset from the exit ports 240, as shown, so that further direction changes are required for the gas to flow from the exit holes 256 to the exit ports 240. These direction changes serve to reduce the velocity of the gas, increasing residence time, and thus efficiency of the inflator. Additionally, the presence of the diverter wall 254 serves to reinforce the blocking wall 242 against the pressures created in the combustion chamber 220, and may permit a thinner material to be used for the blocking wall 242.

The operation of this embodiment is similar to those described above, and will not be discussed in detail. It is noted however, that to cause the reduced thickness area 226 to rupture, the end wall 224 must of course be blocked from movement with the peripheral skirt 222. This is achieved by abutting the end wall 224 against the abutment wall 212. As shown, the outer diameter of the abutment wall 212 is smaller than that of the end wall 224, so that the abutment wall 212 does not block movement of the peripheral skirt 222 toward the first end 16. The space between the abutment tube 210 and sidewall 14 receives the peripheral skirt 222 during this movement, and as such the abutment tube 210 must have a sufficient length to receive the peripheral skirt 222.

It may be seen that the various arrangements disclosed herein will increase the possibility of beginning the regenerative cycle, and will increase the residence time of the gas during the cycle. As noted, these various arrangements are not exclusive, but may be used in various combinations. Further, the various arrangements shown are not limited to use with the particular initiator/fuel chamber arrangements with which they are shown. For example, the blocking wall 242/diverter wall 254 arrangement of FIG. 8 could be used with a tank subassembly 44 as shown in FIG. 1. Other variations are of course possible.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A regenerative monopropellant airbag inflator, comprising:

a housing having a longitudinal axis and defining an interior, said interior including at least one exit port extending through said housing;

an piston within said interior, said piston dividing said interior into a fuel supply chamber and a combustion chamber, said exit port communicating with said combustion chamber, and said piston being mounted for movement along said longitudinal axis;

a quantity of fluid monopropellant housed within said fuel supply chamber;

an initiator operatively associated with said combustion chamber;

a plurality of injection ports extending through said piston for flow of said fluid monopropellant from said fuel supply chamber to said combustion chamber, said injection ports being oriented to focus said fluid monopropellant to a localized area within said combustion chamber; and an isolation cup mounted within said combustion chamber, said isolation cup including a concavity facing said piston, and wherein said localized area is located within said concavity.

2. An inflator as in claim 1, further including an isolation cup mounted within said combustion chamber, said isolation cup including a cavity facing said piston, and wherein said localized area is located within said concavity.

3. An inflator as in claim 2, further including a swirl chamber mounted within said combustion chamber, said swirl chamber having a peripheral wall and first and second ends, and a plurality of entrance ports extending through said peripheral wall, said second end communicating with said at least one exit port.

4. An inflator as in claim 3, wherein said entrance ports are angled to direct flow therethrough to said first end of said swirl chamber.

5. An inflator as in claim 3, wherein said entrance ports are angled with respect to radial to direct flow therethrough in a circular swirl within said swirl chamber.

6. An inflator as in claim 5, wherein said entrance ports are further angled to direct flow therethrough to said first end of said swirl chamber.

7. An inflator as in claim 6, wherein said first end of said swirl chamber has a hemisphere shape to smoothly turn gas flow toward said second end.

8. An inflator as in claim 7, wherein said at least one exit port comprises a single exit port, centered within said second end, and wherein said second end has a truncated annulus shape, with said exit port within said annulus shape.

9. A regenerative monopropellant airbag inflator, comprising:

a housing having a longitudinal axis and defining an interior, said interior including at least one exit port extending through said housing;

an piston within said interior, said piston dividing said interior into a fuel supply chamber and a combustion chamber, said exit port communicating with said combustion chamber, and said piston being mounted for movement along said longitudinal axis;

a quantity of fluid monopropellant housed within said fuel supply chamber;

an initiator operatively associated with said combustion chamber; and a plurality of injection ports extending through said piston for flow of said fluid monopropellant from said fuel supply chamber to said combustion chamber, said injection ports being oriented to focus said fluid monopropellant to a localized area within said combustion chamber wherein said injection ports each include an inlet and an outlet, and said inlets are angularly offset, about said longitudinal axis, with respect to said outlets, to cause a helical flow within said combustion chamber.

10. An inflator as in claim 9, further including an isolation cup mounted within said combustion chamber, said isolation cup including a cavity facing said piston, and wherein said localized area is located within said concavity.

11. An inflator as in claim 9, wherein at least a portion of said inlets of said injection ports are located on a peripheral edge of said piston.

12. A regenerative monopropellant airbag inflator, comprising:

a housing having a longitudinal axis an defining an interior, said interior including at least one exit port extending through said housing;

a piston within said interior, said piston dividing said interior into a fuel supply chamber and a combustion chamber, said exit port communicating with said combustion chamber, and said piston being mounted for movement along said longitudinal axis;

a quantity of fluid monopropellant housed within said fuel supply chamber;

an initiator operatively associated with said combustion chamber; and a plurality of injection ports extending through said piston for flow of said fluid monopropellant fuel from said fuel supply chamber to said combustion chamber, each of said injection ports having an inlet and an outlet, said inlets being angularly offset, about said longitudinal axis, with respect to said outlets, to cause a helical flow within said combustion chamber.

13. An inflator as in claim 12, wherein at least a portion of said inlets are located on a peripheral edge of said piston.

14. An inflator as in claim 12, further including an isolation cup mounted within said combustion chamber, said isolation cup including a cavity facing said piston, and wherein at least a portion of said flow is directed to a localized volume within said concavity.

15. An inflator as in claim 14, wherein at least a portion of said inlets of said injection ports are located on a peripheral edge of said piston.

* * * * *